United States Patent
Nair et al.

(10) Patent No.: US 7,519,364 B2
(45) Date of Patent: * Apr. 14, 2009

(54) SYSTEM AND METHOD FOR SEAMLESS ROAMING BETWEEN WIRELESS NETWORKS

(75) Inventors: Biju Nair, Long Grove, IL (US);
Ognjen Redzic, Chicago, IL (US);
Martin Singer, Northbrook, IL (US);
Robert Boxall, Elmhurst, IL (US)

(73) Assignee: PCTEL, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/530,261

(22) Filed: Sep. 8, 2006

(65) Prior Publication Data

US 2007/0076665 A1    Apr. 5, 2007

Related U.S. Application Data

(63) Continuation of application No. 10/634,536, filed on Aug. 4, 2003, now Pat. No. 7,133,669.

(60) Provisional application No. 60/400,615, filed on Aug. 2, 2002.

(51) Int. Cl.
*H04Q 7/20*    (2006.01)

(52) U.S. Cl. .............. 455/432.1; 455/552.1; 455/418; 455/435.2; 370/331

(58) Field of Classification Search ......... 455/418–420, 455/436–442, 550.1–553, 423, 67.1, 422, 455/517, 432.1–435.3, 450–453, 422.1, 403, 455/556.1–557; 370/338, 328, 331–335
See application file for complete search history.

(56) References Cited

U.S. PATENT DOCUMENTS

| | | | |
|---|---|---|---|
| 5,903,832 A | 5/1999 | Sappanen et al. | 455/435.3 |
| 5,946,634 A | 8/1999 | Korpela | |
| 6,058,422 A | 5/2000 | Ayanoglu et al. | |
| 6,108,562 A | 8/2000 | Rydbeck et al. | |
| 6,134,453 A * | 10/2000 | Sainton et al. | 455/553.1 |
| 6,243,581 B1 | 6/2001 | Jawanda | |
| 6,463,298 B1 * | 10/2002 | Sorenson et al. | 455/552.1 |
| 6,463,583 B1 | 10/2002 | Hammond | 717/162 |
| 6,496,511 B1 | 12/2002 | Wang et al. | 370/401 |
| 6,546,425 B1 * | 4/2003 | Hanson et al. | 709/227 |
| 6,625,451 B1 | 9/2003 | La Medica et al. | 455/434 |
| 6,801,777 B2 | 10/2004 | Rusch | 455/452.2 |
| 6,826,762 B2 | 11/2004 | Shell et al. | 719/328 |
| 6,829,481 B2 * | 12/2004 | Souissi | 455/436 |
| 7,065,367 B2 * | 6/2006 | Michaelis et al. | 455/452.2 |
| 7,089,033 B2 * | 8/2006 | Leinonen et al. | 455/553.1 |

(Continued)

*Primary Examiner*—Kamran Afshar

(57) ABSTRACT

A method for the seamless switching of a wireless device between wireless wide area networks (WWANs) and wireless local area networks (WLANS) includes automatically detecting the available WWANs and WLANs, selecting one of the available networks for use by the wireless device, and connecting the wireless device to the selected network. The method also includes maintaining the network connection by monitoring the connection and, upon determining that the connection has been lost, selecting another available network for use and connecting the wireless device the other network. Additionally, the method communicates information about the availability networks and connection status to a user of the wireless device, which allows the user to manually switch the wireless device connection from the automatically selected available network to another available network. Further, a wireless device implements the above described method.

8 Claims, 6 Drawing Sheets

U.S. PATENT DOCUMENTS

| | | |
|---|---|---|
| 2002/0059434 A1 | 5/2002 | Karaoguz et al. ............ 709/228 |
| 2002/0085516 A1* | 7/2002 | Bridgelall .................... 370/329 |
| 2003/0053437 A1 | 3/2003 | Bahl et al. ................... 370/345 |
| 2003/0134636 A1 | 7/2003 | Sundar et al. ................ 455/432 |
| 2003/0142641 A1* | 7/2003 | Sumner et al. .............. 370/328 |
| 2003/0227892 A1 | 12/2003 | Cabana ....................... 370/338 |
| 2004/0205158 A1 | 10/2004 | Hsu ............................ 709/227 |
| 2004/0216135 A1 | 10/2004 | Heinbeck .................... 719/318 |
| 2005/0064866 A1 | 3/2005 | Sun et al. ................... 455/426.1 |
| 2005/0143071 A1 | 6/2005 | Jaakkola et al. ............. 455/436 |
| 2006/0084417 A1* | 4/2006 | Melpignano et al. ........ 455/418 |
| 2006/0291455 A1* | 12/2006 | Katz et al. ................... 370/355 |

* cited by examiner

SYSTEM AND METHOD FOR SEAMLESS ROAMING BETWEEN WIRELESS NETWORKS

CROSS-REFERENCE TO RELATED APPLICATIONS

The present application is a Continuation of U.S. Utility Application No. 10/634,536 filed on Aug. 4, 2003 entitled "System and Method for Seamless Roaming Between Wireless Networks" and claims the benefit of priority under 35 U.S.C. § 119(e) from U.S. Provisional Application No. 60/400,615 filed on Aug. 2, 2002 to Nair, et al. and entitled "Seamless Roaming Between Wireless Networks" and which is incorporated herein by reference.

BACKGROUND OF THE INVENTION

1. Field of the Invention

The present invention relates generally to the field of wireless technology and, more particularly, to seamless roaming between wireless networks.

2. Description of the Related Art

Wireless technology allows electronic devices to communicate with one another without the use of physical lines (e.g., wire or fiber optic cable), and accordingly, has become increasingly popular in recent years. There are different types of access networks in wireless technology, for example, the wireless local area network (WLAN) and the wireless wide area network (WWAN). WWANs are used by traditional cellular companies to provide high-mobility access (e.g., for users moving in cars) over a broad coverage area. WLANs can be used in buildings (e.g., homes or businesses) for stationary or low mobility access.

While WLANs provide higher throughput rates (e.g., ranging from 11 Mbps to 54 Mbps), such networks generally do not provide a broad area of coverage, and thus, are not always suitable for high mobility access. On the other hand, while WWANs provide broad ranging coverage, they generally have lower throughput rates.

Previously developed techniques have provided for connections to both a WLAN and a WWAN by a mobile device. With these techniques, separate device applications were used to independently support and manage different kinds of connections. That is, one application would be used for WWAN connections, and another application would be used for WLAN connections. This was problematic in that the two applications were independent, and thus, did not provide the ability to coordinate connections for different types of wireless networks. Thus, whenever there was a loss of connection as a mobile device was moved out of the coverage area, of one kind of wireless network into the coverage area of another kind of network, the previously developed techniques were not able to automatically switch connections. Instead, a user had to manually switch from one application managing hardware for a connection of the first kind of wireless network to a different application managing hardware for a connection of the second kind of wireless network. In order to make this manual switch, the user was required to shut down all applications using the external network connection and then, after the switch was made, to reinitiate network connectivity and restart all applications. Accordingly, the previously developed techniques were disruptive, time consuming, and not user friendly.

Therefore, what is needed is a way to automatically and seamlessly switch between and among different types of wireless networks.

SUMMARY OF THE INVENTION

According to embodiments of the present invention, systems and methods provide un-interrupted and ubiquitous wireless access, with seamless hand-off between different kinds of networks. Thus, applications are not affected as a user roams between and among WLANs and WWANs. The embodiments of the present invention may also facilitate handing off a user to WLANs, whenever possible to more cost effectively use the available WWAN bandwidth. Important technical advantages of the present invention are readily apparent to one skilled in the art from the following figures, descriptions, and claims.

BRIEF DESCRIPTION OF THE DRAWINGS

For a more complete understanding of the present invention, for further features and advantages, applicants now make the following description, taken in conjunction with the accompanying drawings, in which.

DETAILED DESCRIPTION OF THE INVENTION

Figure 1:
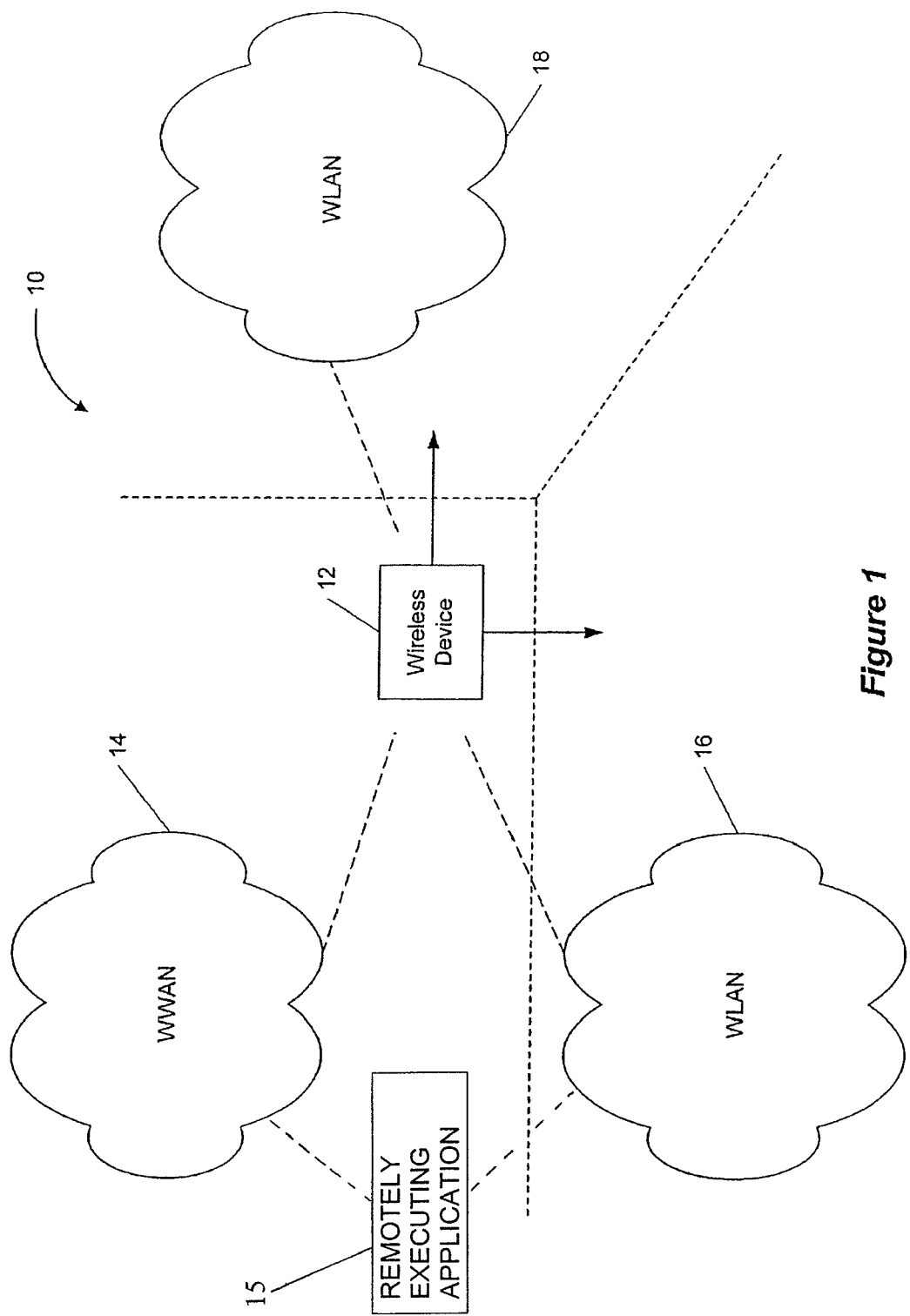
FIG. 1 illustrates an environment in which systems and methods, according to embodiments of the present invention, may operate.

Turning first to the nomenclature of the specification, the detailed description that follows is represented largely in terms of processes and symbolic representations of operations performed by conventional computer components, such as a local or remote central processing unit (CPU), processor, server, or other suitable processing device associated with a general purpose or specialized computer system, memory storage devices operatively associated with the processing device, and connected local or remote display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, an application, process, method, routine, or sub-routine is generally considered to be a sequence of computer-executed steps leading to a desired result. These steps generally require manipulations of physical quantities. Usually, although not necessarily always, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that automatic manipulations within the computer system are often referred to in terms such as adding, comparing, moving, searching, or the like, which are typically associated with manual operations performed by a human operator. It must be understood that, in most instances, no involvement of the human operator is necessary, or even desirable, in the present invention. However, some of the operations described herein are machine operations performed in conjunction with the human operator, or user, that interacts with the computer or system. Therefore, unless noted as a manual, user operation, all operations are presumed to be automatic.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus, or hardware device, to perform one or more of the method steps described herein by way of dedicated computer systems with hard-wired logic or programs stored in non-volatile memory, such as read-only memory (ROM).

Overview

According to embodiments of the present invention, systems and methods provide automatic and seamless roaming between wireless networks, including between different kinds of wireless networks (e.g., WLAN and WWAN). Embodiments of the present invention can provide seamless access between two disparate wireless access technologies, such as a WLAN and a WWAN. The systems and methods of the present invention can provide or support automatic detection and connection to WLANs and WWANs.

System For Seamless Roaming

FIG. 1 illustrates an environment 10 in which embodiments of the present invention may operate. As depicted, environment 10 includes a plurality of wireless networks through which a wireless device 12 may migrate and communicate. These networks can be, for example, a wireless wide area network (WWAN) 14, a first wireless local area network (WLAN) 16, and a second WLAN 18.

Each wireless networks 14, 16, 18 can be a communication network that supports wireless communication. Each network supports at least one wireless link or device connection. As such, the networks may support a variety of communications, including, but not limited to, analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR). The wireless networks 14, 16, 18 may utilize or support various protocols. Exemplary protocols for WLANs 16, 18 include IEEE 802.11, HomeRF, Bluetooth, HiperLAN and the like. Exemplary protocols for WWAN 14 include Time Division Multiple Access (TDMA, such as IS-136), Code Division Multiple Access (CDMA), 1xRTT, General Packet Radio Service (GPRS), Enhanced Data rates for GSM Evolution (EDGE), Global System for Mobile communications (GSM), Universal Mobile Telecommunications System (UMTS), and Integrated Digital Enhanced Network (iDEN) Packet Data. Each connection of a wireless network may have a respective identifier such as, for example, a particular Internet Protocol (IP) address. Transmissions over the wireless networks 14, 16, 18 may be analog or digital. The wireless networks may include or be supported by a public switched telephone network (PSTN) and/or a private system (e.g., cellular system) implemented with a number of switches, wire lines, fiber-optic cable, land-based transmission towers, space-based satellite transponders, and the like. In one embodiment, the wireless networks may include any other suitable communication system, such as a specialized mobile radio (SMR) system. Each wireless network 14, 16, 18 may have a respective range of operation. The ranges of the various wireless networks can overlap in coverage.

The wireless networks 14, 16, 18 can be maintained or operated by the same or different service providers. In general, a service provider can be an entity that delivers services to one or more users, who, for example, access the network with a wireless device. These services may include wireless service, and possibly a host of other services. including, for example, plain old telephone service (POTS), digital telephony service, cellular service, pager service, and the like. The user of the wireless device 12 can be a subscriber to one or more of the services provided by one or more of the service providers with the wireless networks 14, 16, 18.

The wireless device 12 can be an electronic device with capability for communicating by wireless technology. Thus, wireless device 12 can be, for example, a laptop or desktop computer, a wireless personal digital assistant (PDA), a cellular phone, or any other wireless-capable, suitable electronic device. The wireless device 12 can be used by a respective user, who can move among and through the effective ranges of operation for the various wireless networks 14, 16, 18. If the wireless device 12 is within the range a particular wireless network, the device 12 will be able to communicate through a link of that wireless network. The wireless device 12 may run one or more applications that exchange data/information through wireless networks as the applications are run. Such an application can be, for example, a network browser that exchanges information with the distributed remotely executing application 15 known as the "World Wide Web." Another exemplary application 15 can be electronic mail or instant messaging services.

In general, WLANs provide higher throughput rates (e.g., from 11 Mbps to 54 Mbps and higher), but are not conducive to use in higher mobility applications (e.g., such as when a user is in a car). WWANs can be used in high mobility applications, but do not provide as much throughput as WLANs. Thus, to increase throughput rates for the user of the wireless device 12, it is desirable to connect to a WLAN when one is available and connection to it is possible, while connecting to a WWAN when a WLAN connection is not available or possible.

To provide uninterrupted and effective wireless access for the wireless device 12 in exemplary environment 10, the present invention provides systems and methods so that WLANs and WWANs are able to automatically and seamlessly hand-off communications with the wireless device 12 as it roams between or among them, without the applications executing on the wireless device 12 being adversely affected.

System For Seamless Roaming

Figure 2:
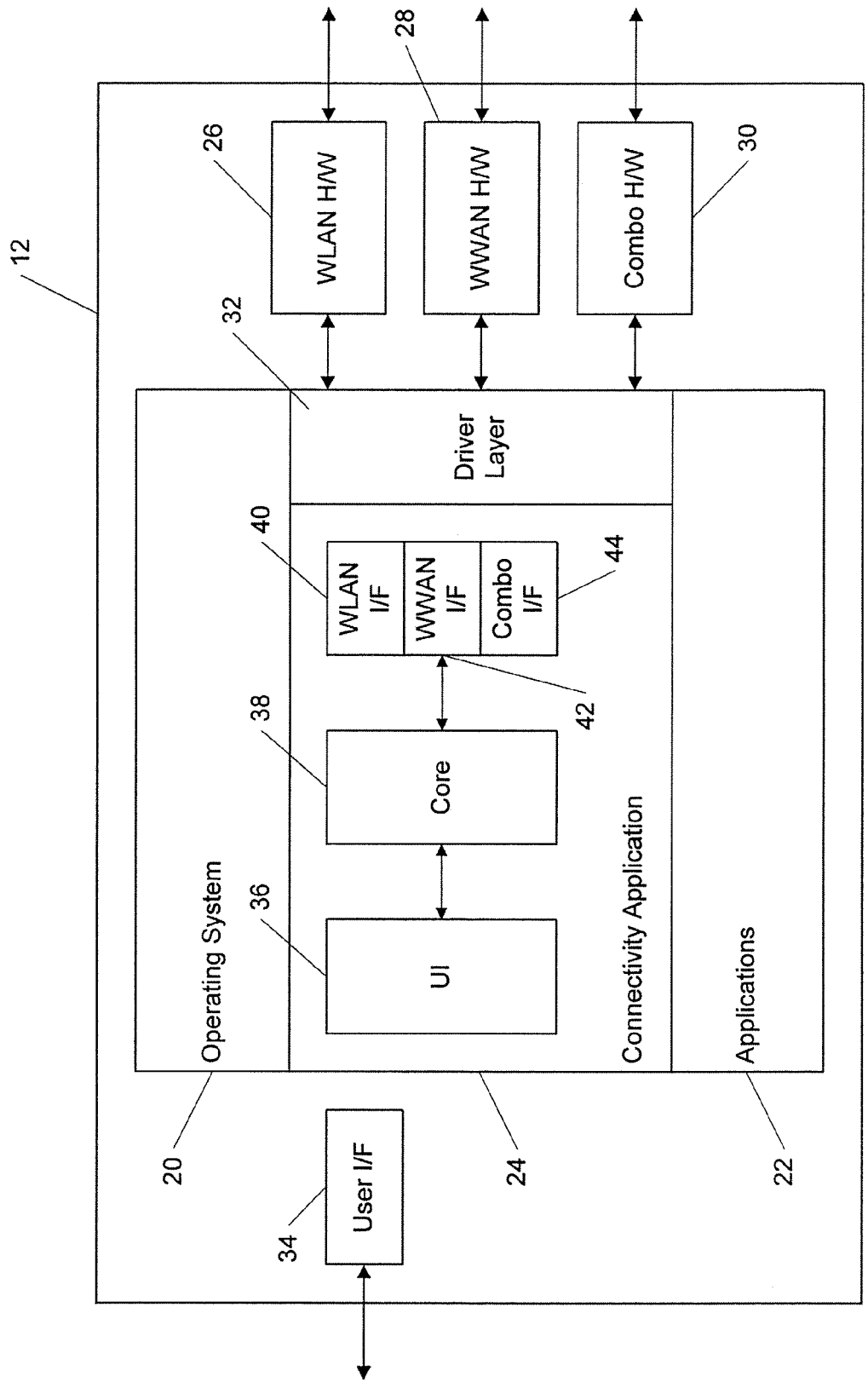
FIG. 2 illustrates an exemplary system for seamless roaming between wireless networks according to an embodiment of the present invention.

FIG. 2 illustrates an exemplary system for seamless roaming between wireless networks according to an embodiment of the present invention. As shown, this system can be incorporated into or comprise a wireless device 12. The wireless device 12 can be any suitable electronic device such as, for example, a portable personal computer (PC), wireless PDA or cellular phone, having a data processing facility supported by memory (either internal or external) and being wireless network capable.

A number of networking hardware devices, such as WLAN hardware 26, WWAN hardware 28, and combination hardware 30, support connections between wireless device 12 and various wireless networks. WLAN hardware 26 supports connection with a WLAN. WWAN hardware 28 supports connection with a WWAN. Combination hardware 30 supports connection with either a WLAN or a WWAN. The networking hardware devices could be a wireless modem, a wireless network interface card (NIC), or any other suitable hardware peripheral device for supporting a wireless connection. In other embodiments, such devices can be implemented in any combination of hardware and software. A driver layer 32, which may be implemented in software or hardware or both, functions as a hardware controller for the WLAN hardware 26, WWAN hardware 28, and combination hardware 30.

A user interface (I/F) 34 generally functions to enable a human user to interact with the wireless device 12, for example, to run applications (e.g., word processing), browse the Internet, check email, and the like. The functionality of the user interface 34 can be performed by one or more suitable input devices (e.g., keypad, touch screen, input port, pointing device, microphone, and/or other device that can accept user input information) and one or more suitable output devices (e.g., video display, output port, speaker, or other device, for conveying information, including digital data, visual information, or audio information). In one embodiment, each user interface 34 may comprise or be operable to display at least one graphical user interface (GUI) having a number of interactive devices, such as buttons, windows, pull-down menus, and the like to facilitate the entry, viewing, and/or retrieval of information.

The wireless device 12 may operate under the control of a suitable operating system (OS) 20, such as, for example, MS-DOS, MAC OS, WINDOWS NT, WINDOWS 95, WINDOWS CE, OS/2, UNIX, LINUX, LINDOWS, XENIX, PALM OS, and the like. One or more software applications 22 may run on the wireless device 12. Each application 22 may interact with the operating system 20. These applications 22 may support numerous services or functions such as, for example, document sharing, accounting, word processing, application sharing, file transfer, remote control, browser, voice over Internet Protocol (IP), user authentication, address book, files and folders, accounting, database management, and the like. At least a portion of these applications 22 may require the exchange of information over the wireless network with other electronic devices as the applications 22 are executing on the wireless device 12.

A connectivity application 24, provided in the software layer, acts as a pseudo router of network addresses and connectivity. The connectivity application 24 logically resides between the operating system 20 and the driver layer 32 of hardware controllers. The connectivity application 24 may logically "sit on top" of operating system 20. Connectivity application 24 may support the detection of wireless connections that are available in any given location to the wireless device 12. These connections include both WLAN and WWAN connections. Furthermore, unlike previously developed techniques, the connectivity application 24 maintains information and handles connectivity for different kinds of wireless networks. As such, connectivity application 24 is able to coordinate the connection of the wireless device 12 with different wireless networks, thereby providing seamless transition or handoff between the networks, including from a WLAN connection to a WWAN connection, and vice versa, as well as between WLAN or WWAN connections. Connectivity application 24 may provide the IP address of the wireless connection in use to the operating system 20, which in turn publishes this IP address to all applications 22. As depicted, in one embodiment, connectivity application 24 includes a user interface (UI) component 36, a core component 38, a WLAN interface component 40, a WWAN interface component 42, and a combination interface component 44.

WLAN interface component 40, WWAN interface component 42, and combination interface component 44 provide or support an interface with the driver layer 32 comprising device drivers, which can be supplied by the respective hardware manufacturers of the networking hardware devices (e.g., WLAN hardware 26, WWAN hardware 28, and combination hardware 30). WLAN interface component 40 may handle all the communications with, for example, any WiFi compliant 802.11a card and its driver. WLAN interface component 40 can, for example, interface with the application program interface (API) of the WLAN card. This component 40 implements both the standard interfaces as well as specific aspects of communicating with the WLAN card, to retrieve common information such as Status, Signal Strength, MAC Address, Firmware version, and the like. The WLAN interface component 40 also handles sending and receiving messages to the card. The WWAN interface component 42 and the combo interface component 44 have similar functionality to its WLAN counterpart, except that it is implemented to communicate with the API of the WWAN card.

The UI component 36 provides support for the presentation (e.g., visually, audibly, physically, etc.) of information relating to the wireless connections for the wireless device 12. This information may include, for example, network information for WWAN 14 and WLANs 16, 18. The UI component 36 may also allow a user to configure or set (e.g., enabling and disabling) the wireless connections for the device 12. In one embodiment, for example, UI component 36 may enable a user to readily and easily, yet manually or automatically, switch from one wireless network connection (e.g., for WWAN 14) to another wireless network connections (e.g., for WLAN 16) with no adverse effect on applications running on the wireless device 12.

The core component 38 is in communication with UI component 36, WLAN interface component 40, WWAN interface component 42, and combination interface component 44. The core component 38 implements the logic for keeping track of, handling, and managing the connectivity to the wireless networks and informing the operating system 20 about any changes. The core component 38 may also be responsible for automated switching of the connections which, in one embodiment, can be rule-based switching. The core component 38 may automatically authenticate and connect the wireless device 12 to preferred wireless networks that are detected.

In operation, as the wireless device 12 is moved between or among the effective ranges of various wireless networks (WLAN or WWAN), connectivity application 24 functions to change connections from one wireless network to another wireless network. In one aspect, the change of wireless connection can be automatic such that, for example, upon loss of connectivity from any one connection, the connectivity application 24 will automatically initiate a new connection and pass the respective IP address to operating system 20. Then, as applications 22 are subsequently refreshed using an IP connection, the applications 22 will automatically pick up the new IP address and start using the new address for wireless connectivity (e.g., according to the rules of core component 38). This may occur without any noticeable loss of connectivity to the user of the wireless device 12. In another aspect, the change of wireless connection can be manually initiated by the user. Connectivity application 24 supports the detection of wireless connections that may be available for any given location. Information about the available wireless connections may be accessed by the user from connectivity application 24 via user interface 34. Then, the user can select which wireless connection to use for connectivity (e.g., to the Internet).

As such, the system according to an embodiment of the present invention provides ubiquity of access to wireless data and efficiency of spectral usage in cellular bands when using wireless data. Thus, for example, Internet-enabled applications 22 do not experience a loss of connectivity as a result of connection loss by wireless device 12 with either a WWAN or a WLAN. Nor do the applications 22 experience loss of connection as result of transition from one wireless network to another (e.g., from WWAN to WLAN). Furthermore, the system allows cellular service providers to offer wireless data services supported by a combination of their existing two-and-a-half generation ("2.5G") networks (such as, but not limited to, GPRS, CDMA 1xRTT) and IEEE 802.11 WLAN networks (such as, but not limited to, 802.11a, 802.11b, 802.11g, etc.), with minimal risk of wireless data consuming the entire available capacity of the cellular networks.

User Interface Component

Figure 3:
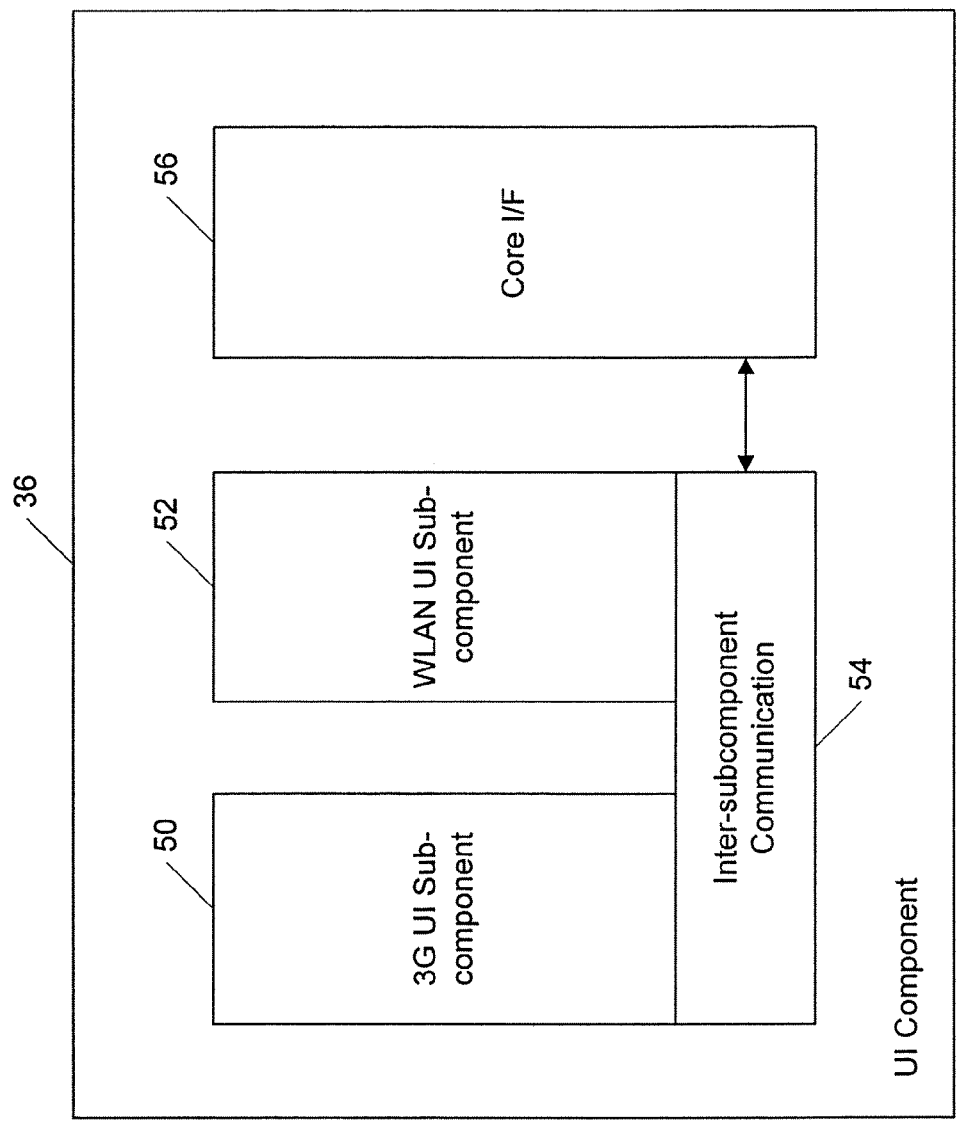
FIG. 3 illustrates an exemplary user interface component according to an embodiment of the present invention.

FIG. 3 illustrates an exemplary user interface component 36 according to an embodiment of the present invention. As shown in FIG. 3, the user interface component 36 can be completely separated from the core functionality (e.g., managing connections) provided by core component 38 (of FIG. 2) of the connectivity application 24. This separability can be done in order to allow users of the connectivity application 24 to provide their own user interfaces to the application, each interface having the look and feel (along with branding) desired by the particular service provider. As shown, user interface component 36 includes a third-generation (3G) UI subcomponent 50, a WLAN UI subcomponent 52, an inter-subcomponent communication module 54, and a core interface (I/F) subcomponent 56.

The 3G UI subcomponent 50 may handle the connect/disconnect functionality for various WWANs, which can be the 2.5G or 3G of mobile communications technology. Examples of such technologies include, but are not limited to GPRS, CDMA 1xRTT and iDEN Packet Data services (for 2.5G) and W-CDMA based services such as UMTS and CDMA 3xRTT (for 3G). Relative to first generation (e.g., analog cellular) and second generation (e.g., digital PCS), 2.5G and 3G technology provides increased bandwidth. For example, 3G technology provides up to 384 Kbps when a wireless device is stationary or moving at pedestrian speed, 128 Kbps in a car, and 2 Mbps in fixed applications. 3G UI subcomponent 50 may present or display information for the signal strength of each available WWAN (e.g., 2.5G or 3G) connection, as well as type of connection (e.g., circuit-switched or packet-switched). This subcomponent 50 may also display or present information about the availability of WWAN service, or lack thereof.

WLAN UI subcomponent 52 can, among other things, keep track of and/or present all identified WLANs in the particular location of wireless device 12, as well as their current connections and encryption status. This WLAN UI subcomponent 52 may also handle selection by a user and connection of the wireless device 12 to the various WLANs.

Taken together, 3G UI subcomponent 50 and WLAN UI subcomponent 52 provide the user of the wireless device 12 with a real-time picture of all available connections to the various wireless networks, and may direct the user to a location where connectivity is available. A user of the wireless device 12 can toggle connections between WWAN and WLAN connections by interacting with 3G UI subcomponent 50 and WLAN UI subcomponent 52.

The inter-subcomponent communication module 54 is responsible for communicating the status of each of the subcomponents 50 and 52. The inter-subcomponent communication module 54 may notify core component 38 of connection status change for each of these subcomponents. The core I/F subcomponent 56 interacts with core component 38 of connectivity application 24. Core interface 54 may, among other things, communicate the status of the wireless connections and user interactions with UI component 36 to the core component 38.

Core Component

Figure 4:
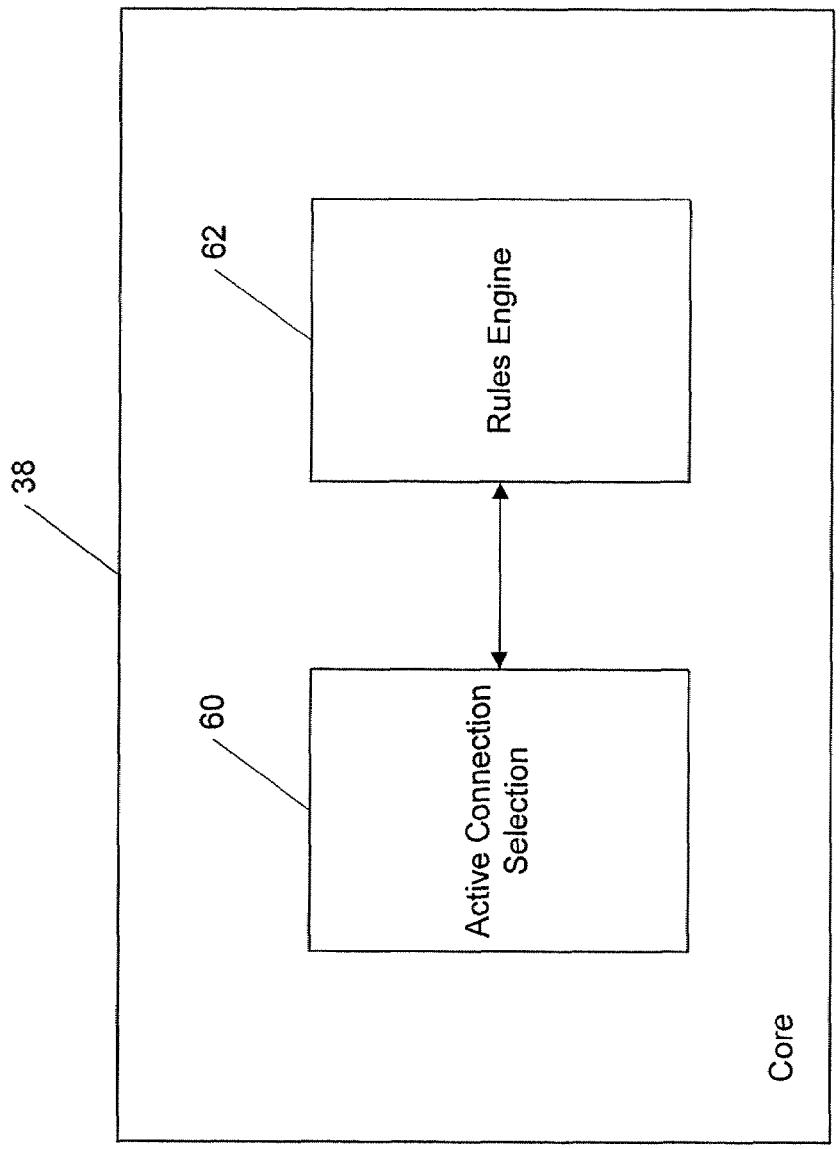
FIG. 4 illustrates an exemplary core component according to an embodiment of the present invention.

FIG. 4 illustrates an exemplary core component 38 according to an embodiment of the present invention. As shown, the core component 38 generally functions to handle and manage the connectivity to the wireless networks and inform the operating system 20 about any changes. As depicted, the core component 38 includes an active connection selection 60 and a rules engine 62.

The active connection selection 60 keeps track of the various wireless connections which are presently available (including both WLAN and WWAN connections) and also the particular wireless connection, that is currently in use by the wireless device 12. The active connection selection 60 publishes the active connection information to the operating system 20; that is, it provides the operating system 20 with information (e.g., IP address) for the current wireless connection. The wireless connection currently in use can be changed by modifying (or toggling) current active connection 60, either by a direct user intervention or as a result of one or more rules in the rules engine 62.

The rules engine 62 may implement and execute a number of rules for automated switching of the wireless connections, and authentication and connection of the wireless device 12 to a preferred wireless network. These rules may define, for example, what to do when a GPRS connection is lost. Rules engine 62 may also allow the rules themselves to be created, modified, or deleted, thereby defining the characteristic behavior of core component 38.

The rules engine 62 is responsible for making the decision as to which wireless network (e.g., WWAN 14, WLAN 16, or WLAN 18) to connect in the event of lost connectivity or the availability of multiple wireless networks. The core component 38 automatically detects any available wireless networks in the area of wireless device 12 and uses the rules engine 62 to determine to which network to connect. The rules engine 62 functions on the basis of a combination of inputs from the user as well as predefined rules provided by one or more service providers (who operate or maintain the wireless networks and/or provide services to the user). By way of illustration, two examples of the operation of rules engine 62 according to the present invention are presented below.

The first rule example illustrations the operation of a user supplied rule. In a user's neighborhood, there are two wireless networks, Network A and Network B. Network A provides fast connectivity, but is unreliable and down about 50% of the time. Network B is highly reliable, but provides only about 50% of the data rate of Network A. The user creates a rule in the rules engine 62 that gives higher priority to the Network A, rather than Network B. When the core component 38 uses the rules engine 62 to decide to which detected network to connect, the rules engine 62 will recommend that the wireless device 12 connect to Network A. In the event of loss of connectivity between the wireless device 12 and Network A, the core component 38 will again use the rules engine 62, which returns a recommendation that the wireless device 12 connect, secondarily, to Network B.

The second rule example illustrations the operation of a service provider supplied rule. A service provider provides WWAN services through Network P and WLAN services through Network Q. For technical reasons, such as preserving spectrum availability on the WWAN (Network P), a service provider may specify a rule in the rule engine 62 that recommends that a user, who is currently on the WWAN, must be intelligently switched to the WLAN, as soon as it becomes available, thereby minimizing the number of users on the WWAN.

Because core component 38 maintains information and handles connectivity for various kinds of wireless networks (e.g., WWAN and WLAN), connectivity application 24 is able to coordinate for seamless transition or handoff between wireless networks, including from a WLAN connection to a WWAN connection, and vice versa, or between different WWAN or WLAN connections. This seamless session switching functionality can be handled by a specific implementation of a well-defined standard such as, for example, Mobile Internet Protocol (IP) or IPv6 (which is also known as IPng, or IP next generation).

Method for Seamless Roaming

Figure 5:
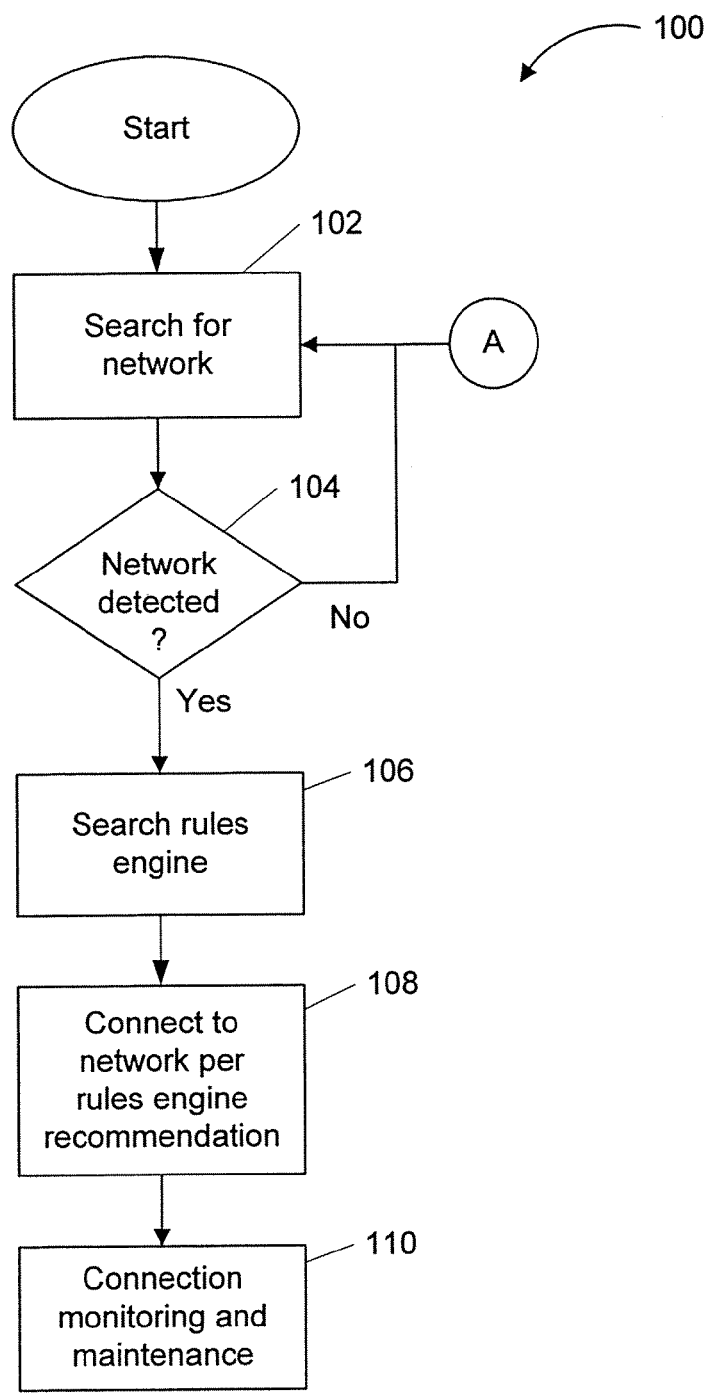
FIG. 5 illustrates a flow chart of an exemplary method for seamless roaming between wireless networks according to an embodiment of the present invention.

FIG. 5 illustrates a flow chart of an exemplary method 100 for seamless roaming between wireless networks according to an embodiment of the present invention. As shown in FIG. 5, the method 100 can be performed, at least in part, by a connectivity application 24 running on a wireless device 12 that has mobility through the areas of coverage provided by one or more wireless networks. The method 100 begins at step 102, where the wireless device 12 searches for available wireless networks (e.g., WWAN, WLAN, etc.). At step 104, the connectivity application 24 determines whether at least one network has been detected. If no network is detected, the method 100 returns to step 102 where the wireless device 12 continues to search for a wireless network.

If at least one network is detected, then at step 106 wireless device 12 searches the rules engine 62 of the connectivity application 24 to identify one or more applicable rules for connecting the wireless device 12 to one of the detected networks. At step 108, the connectivity application 24 directs the wireless device 12 to connect to a particular detected network per the recommendation of rules engine 62. Once connected, the connection is monitored and maintained at step 110 (discussed further, below).

Figure 6:
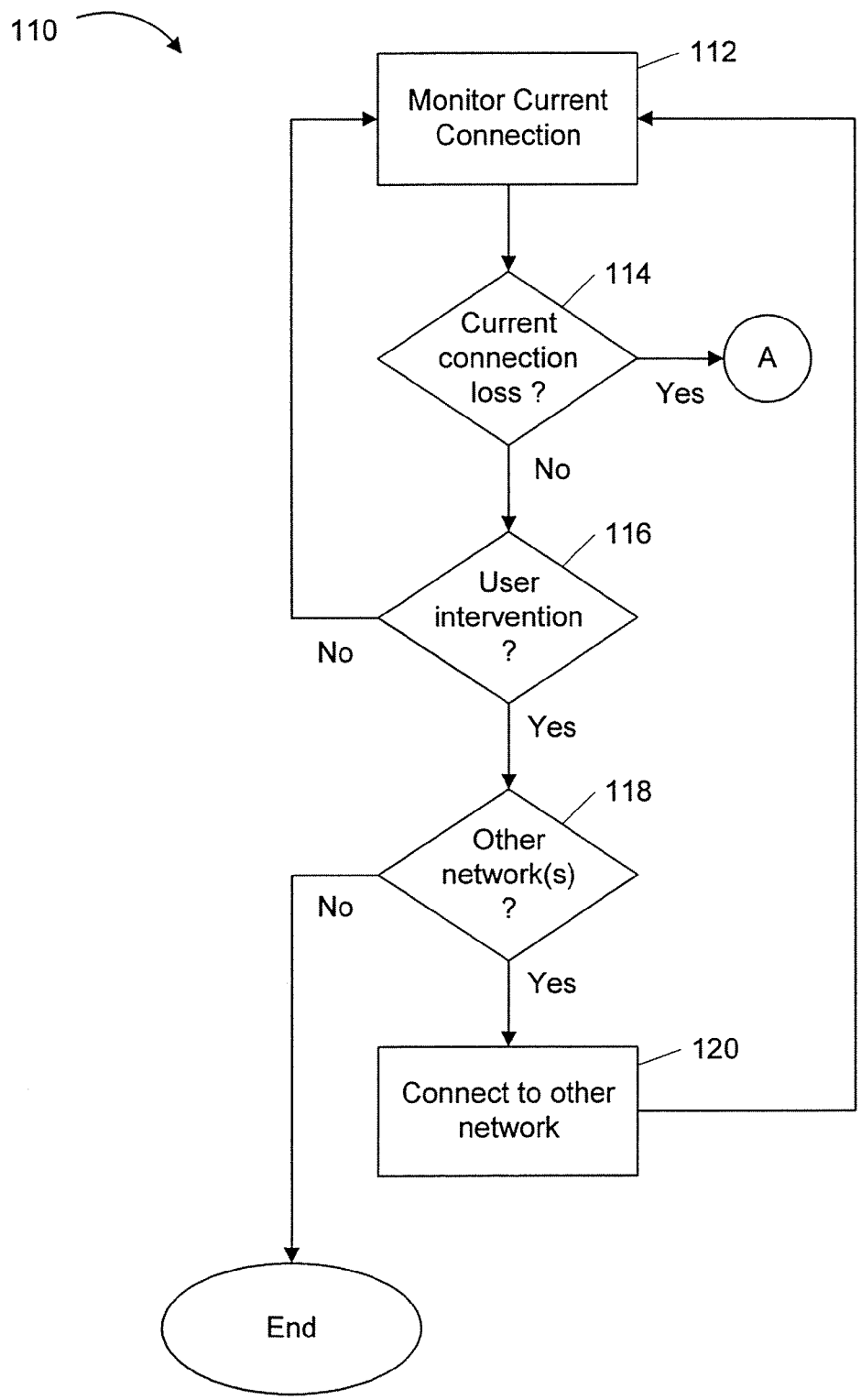
FIG. 6 illustrates a flow chart of an exemplary method for network connection monitoring and maintenance according to an embodiment of the present invention.

FIG. 6 illustrates a flow chart of an exemplary method for network connection monitoring and maintenance according to an embodiment of the present invention. As shown in FIG. 6, the connectivity application monitors the current network connection at step 112. Such monitoring can include, for example, measuring the existence or strength of, or perceiving the desirability of maintaining, the current network connection. At step 114, the wireless device 12 determines whether there has been a loss in the wireless connection. If there is a loss, then method 100 returns to step 102 where the wireless device 12 searches for available wireless networks. Otherwise, if there has not been a loss of connection, then at step 116, the connectivity application 24 determines whether there has been any user intervention such as, for example, a user shutting down the wireless device 12 or initiating a manual switching of the wireless connection between or among the different available networks. If there has not been any user intervention, then the method 100 returns to step 112 where the current wireless connection is further monitored.

On the other hand, if at step 116 there has been user intervention, then at step 118 the connectivity application 24 determines whether there the user initiated an instruction to manually switch connection to another wireless network. If there is such an instruction, then at step 120 the connectivity application 24 directs the wireless device 12 to connect to the network specified by the user. Upon making this user-initiated switch, the method 100 returns to step 112 and begins monitoring of the new network connection. Otherwise, if there has been user intervention, but not to initiate a manual network connection switch, then the method 100 ends.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A method of connecting a wireless device to at least one wireless network comprising:
    searching for wireless networks that are currently available;
    presenting a real time picture of a plurality of available networks to a user through a user interface of the wireless device and/or connectivity software interfacing to the wireless device;
    the user selecting priority as to a preferred network from the real time picture of the available networks through the user interface of the wireless device;
    responsive to detecting at least one wireless local network, and at least one wireless wide area network, evaluating the predetermined priority as to a preferred type of network to attempt to connect with initially;
    responsive to the preferred network type, control software evaluating at least one pre-established rule to determine which detected network of the preferred type is to be selected; and
    the control software automatically connecting to the determined network of the preferred type to provide communications between an executing applications program and a remotely executing application.

2. A method as in claim 1 which includes monitoring the connection.

3. A method as in claim 2 where monitoring includes determining if the connection has been lost.

4. A method as in claim 3 which includes, in response to a lost connection, searching again for currently available wireless networks.

5. A method as in claim 4 which includes selecting a member of a preferred type of network among wireless local networks and wireless wide area networks if both types are available.

6. A wireless device for seamless roaming between a plurality of different wireless networks comprising:
    first circuitry that executes a selected application program which communicates with a remotely executing application;

second circuitry, coupled to the first circuitry, that includes at least one wireless transceiver and which searches for and responds to a plurality of different available wireless networks;

a real time picture of a plurality of available networks provided to a user through a user interface;

a subcomponent of the user interface that allows the user to select a preferred network from the real time picture of available networks;

control software, coupled to the second circuitry, which selects the preferred network type and a network of the preferred type of the available networks to provide communications between the executing applications program and the remotely executing application, the control software monitors a connection therebetween, and responsive to a connection loss, the control software automatically maintains communications between the executing applications program and the remotely executing application by selecting one of a preferred network type from those networks which continue to be available and initiating communications between the executing application program and the remotely executing application.

7. A device as in claim 6 where the second circuitry includes at least one WLAN interface, and at least one WWAN interface.

8. A device as in claim 6 where the software automatically switches between a first of available WLANs and WWANs to a second of WLANs and WWANs in accordance with a software based rules engine.

* * * * *